US012058966B2

(12) United States Patent
Donaghy et al.

(10) Patent No.: US 12,058,966 B2
(45) Date of Patent: Aug. 13, 2024

(54) PLANT PROCESSING SYSTEMS

(71) Applicant: Spacesaver Corporation, Fort Atkinson, WI (US)

(72) Inventors: Michael C. Donaghy, Waukesha, WI (US); Kenneth R. Durfee, Jr., Janesville, WI (US); Stephen L. Anderson, Roscoe, IL (US); Sean R. Krause, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 353 days.

(21) Appl. No.: 17/381,614

(22) Filed: Jul. 21, 2021

(65) Prior Publication Data
US 2023/0022423 A1 Jan. 26, 2023

(51) Int. Cl.
*A01G 9/02* (2018.01)
*A01F 25/12* (2006.01)

(52) U.S. Cl.
CPC .............. *A01G 9/023* (2013.01); *A01F 25/12* (2013.01)

(58) Field of Classification Search
CPC .......... A01G 9/023; A01G 9/02; A01G 9/022; A01G 9/12; A01G 31/045; A01F 25/12; A47B 43/003; A47B 43/006; A47F 5/0009; A47F 5/0892; A47F 7/143; A47G 7/02; A47G 7/04; A47G 7/042; A47G 2007/048; A47G 7/044; A47G 7/045; A47G 7/047
See application file for complete search history.

(56) References Cited

U.S. PATENT DOCUMENTS

| | | | | |
|---|---|---|---|---|
| 1,738,030 A | * | 12/1929 | Bebb | C23D 9/00 432/259 |
| 4,122,781 A | * | 10/1978 | Potter | A47G 7/041 108/189 |
| 4,754,884 A | * | 7/1988 | Schonenberger | B65G 9/002 211/44 |

(Continued)

FOREIGN PATENT DOCUMENTS

| | | |
|---|---|---|
| FR | 2859091 A1 | 3/2005 |
| JP | 3221334 U | 5/2019 |

OTHER PUBLICATIONS

Pipp Mobile Storage Systems—Dry/Cure Room Mobile Storage. Accessed at https://pipphorticulture.com/vertical-grow-rack/ on Jul. 21, 2021.

(Continued)

*Primary Examiner* — Kristen C Hayes
(74) *Attorney, Agent, or Firm* — Andrus Intellectual Property Law, LLP

(57) ABSTRACT

A plant processing system includes a mobile cart with a support rail, a rack with a rack rail, and a hanger configured to support one or more plants therefrom. The hanger is hangable from either the support rail or the rack rail. The hanger includes a first end having a hook deigned to engage either the support rail or the rack rail. A second end of the hanger includes a tab having a magnet that engages either the support rail or the rack rail to limit movement of the second end of the hanger. A series of crossbars can be attached to the hanger at select locations along the length of the hanger. Each crossbar is configured to support plants or other items along the length of the hanger.

8 Claims, 5 Drawing Sheets

(56) References Cited

U.S. PATENT DOCUMENTS

| | | | | |
|---|---|---|---|---|
| 6,178,692 B1 * | 1/2001 | Graven | ............... | A01G 9/022 |
| | | | | 47/DIG. 6 |
| 6,299,118 B1 * | 10/2001 | Farrell | ............... | A01G 9/024 |
| | | | | 248/323 |
| 8,966,815 B1 * | 3/2015 | Smiles | ............... | A01G 9/022 |
| | | | | 47/59 R |
| 9,642,314 B1 * | 5/2017 | Joseph | ............... | A01G 9/249 |
| 2007/0001088 A1 * | 1/2007 | Bowman | ............ | A47G 7/047 |
| | | | | 248/690 |
| 2010/0024292 A1 | 2/2010 | Kertz | | |
| 2011/0084087 A1 * | 4/2011 | Scribner | ............ | A01G 9/022 |
| | | | | 220/751 |
| 2015/0150198 A1 * | 6/2015 | Sinha | ............... | A01G 27/00 |
| | | | | 29/891 |
| 2018/0014486 A1 * | 1/2018 | Creechley | ............ | A01G 9/249 |
| 2018/0295791 A1 | 10/2018 | Calle | | |
| 2019/0297781 A1 | 10/2019 | Palmer | | |
| 2021/0094756 A1 | 4/2021 | Larkins | | |
| 2021/0137026 A1 * | 5/2021 | Durfee | ............... | A01G 9/249 |
| 2022/0312688 A1 * | 10/2022 | Choe | ............... | B65G 17/485 |

OTHER PUBLICATIONS

Pipp Mobile Storage Systems—Drying Cart. Accessed at https://pipphorticulture.com/carts-and-lockers/ on Jul. 21, 2021.

VRE—Hanging Dry Rack. Accessed at http://vresystems.com/products/horticulture/pharma-products/hanging-drying-rack/ on Jul. 21, 2021.

Montel Pull Out Modular Dry Rack. Accessed at https://www.montel.com/en/gallery/dryrak-frreestanding-pull-out modular-dry-rack-497/ on Jul. 21, 2021.

Office Action for Canadian Patent Application No. 3,134,124, dated Jan. 12, 2023.

Office Action for Canadian Patent Application No. 3,134,124, mailed Mar. 14, 2024.

* cited by examiner

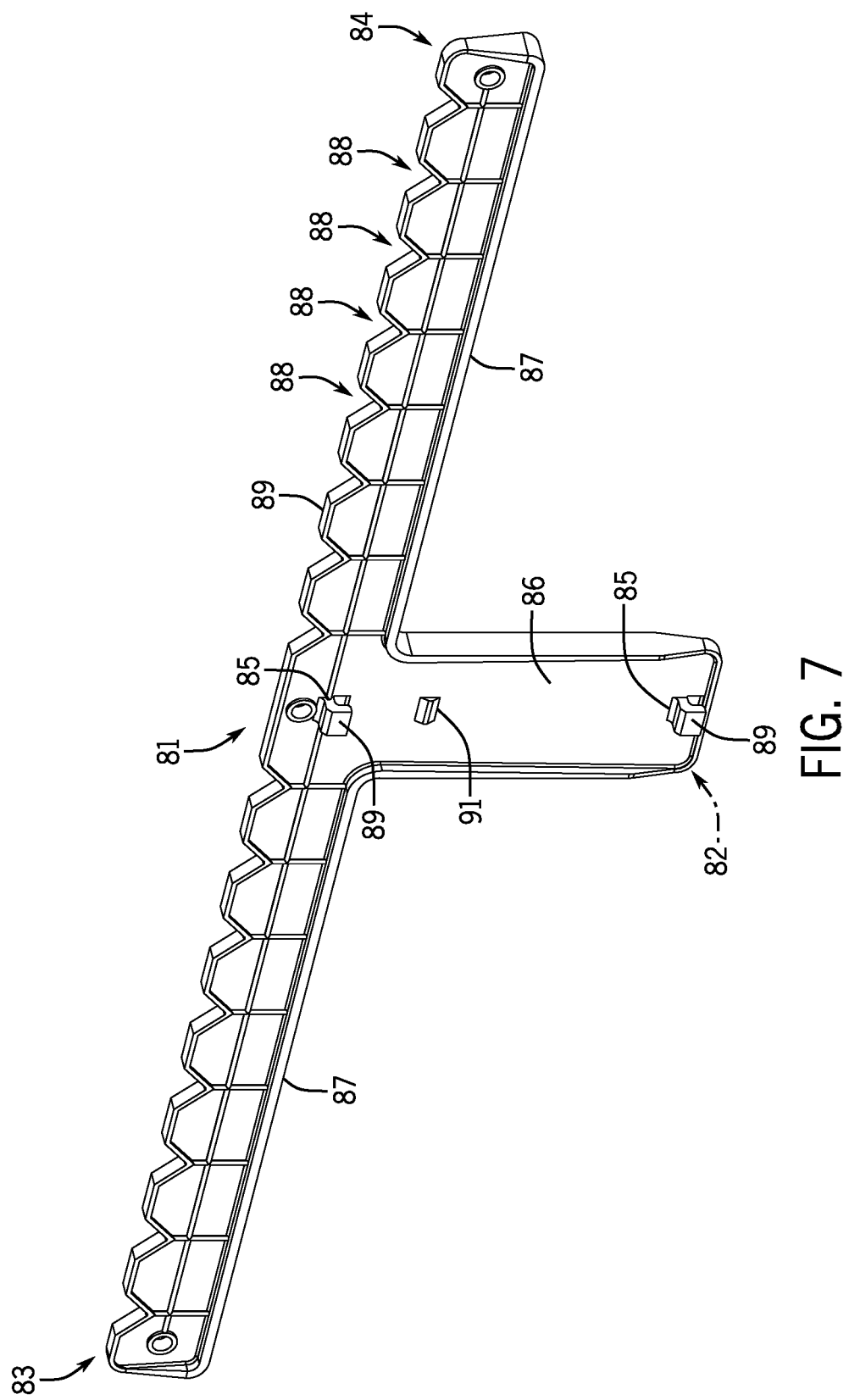

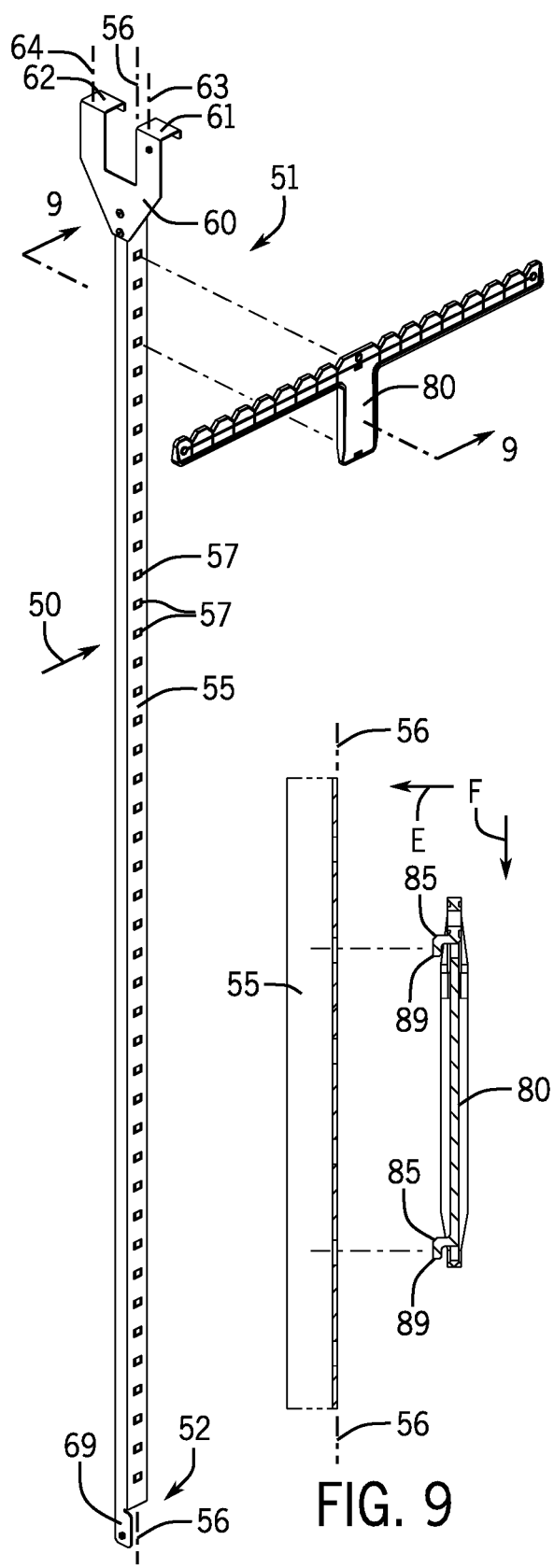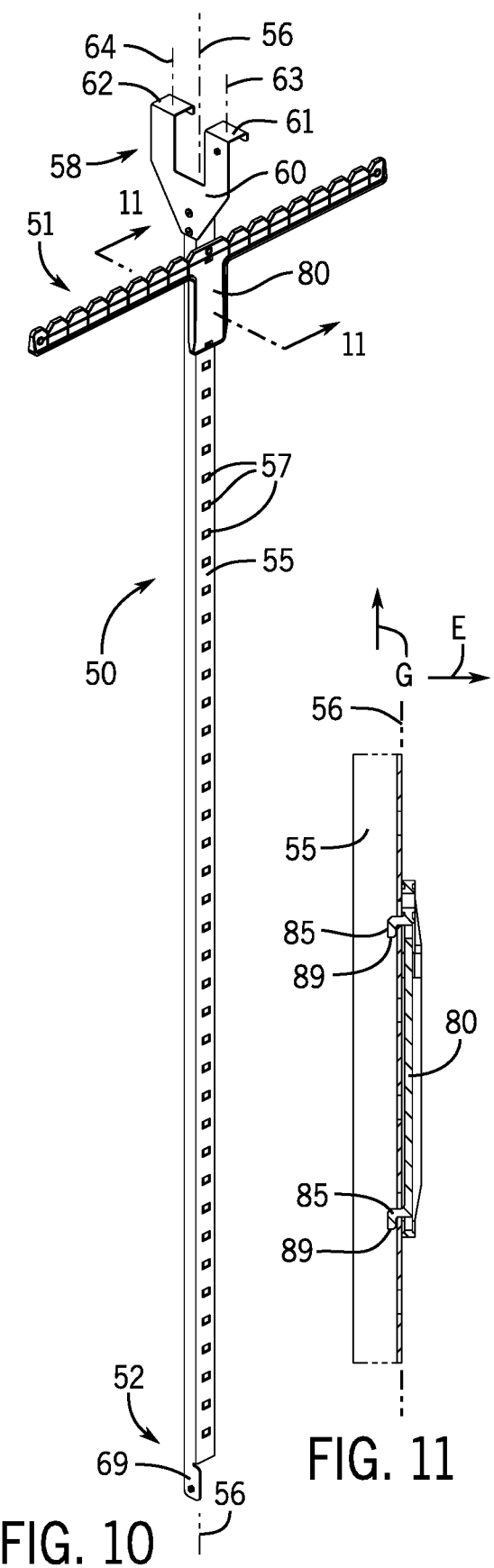

PLANT PROCESSING SYSTEMS

FIELD

The present disclosure generally relates to the plant growing industry, and more specifically relates to plant processing systems for use during the growing and drying cycles.

BACKGROUND

Conventional plant cultivation operations often involve moving plants to different locations within a cultivation facility or property as the plants develop through their lifecycles. The plants may be moved into different environments wherein the plants more quickly develop into the desired end-products. For example, the plants may be moved to a building with mild-humidity and exposure to several hours of sunlight (or artificial light) per day such that the plants grow quickly. After the plants have reached a desired state of maturity, the plants can then be moved to another building with low humidity in which the plants are dried for further processing.

The process of moving plants between different areas of a grow center can be time consuming and costly especially when attempting to move large quantities of plants. Conventional vehicles, such as a flatbed handcarts, can be utilized to move the plants within a facility but such handcarts have a limited capacity of plants that can be carried thereon. Further, the plants must be removed from growing structures, placed on the handcarts and subsequently hung in a drying location. During this process, employees must be careful when moving the plants on conventional vehicles so as to avoid damaging the plants.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a plant processing system includes a cart with a cart rail, a rack with a rack rail, and a hanger configured to support one or more plants thereon. The hanger is hangable from the cart rail or the rack rail.

In certain examples, a hanger for use in a plant processing system having a support structure includes a first hanger end with a hook and a second hanger end opposite the first hanger end. The hook is configured to engage the support structure such that the hanger hangs on the support structure, and the second hanger end is configured to engage the support structure to thereby reduce movement of the hanger relative to the support structure.

In certain examples, a hanger for use in a plant processing system having a support structure includes a hook configured to engage the support structure such that the hanger hangs on the support structure. The hook has a hook magnet that magnetically couples the hanger to the support structure to thereby reduce movement of the hanger relative to the support structure. A tab opposite the hook includes a tab magnet configured to magnetically couple the hanger to the support structure and thereby further reduce movement of the hanger relative to the support structure.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

FIG. 7 is a perspective view of an example crossbar;

FIG. 8 is a perspective view of the example crossbar of FIG. 4 adjacent to the spine of one of the hangers;

FIG. 9 is a cross-sectional view of the crossbar and the hanger along line 9-9 on FIG. 8;

FIG. 10 is a perspective view of the example crossbar coupled to a spine of one of the hangers; and FIG. 11 is a cross-sectional view of the crossbar and the hanger taken along line 11-11 of FIG. 10.

DETAILED DESCRIPTION

Figure 1:
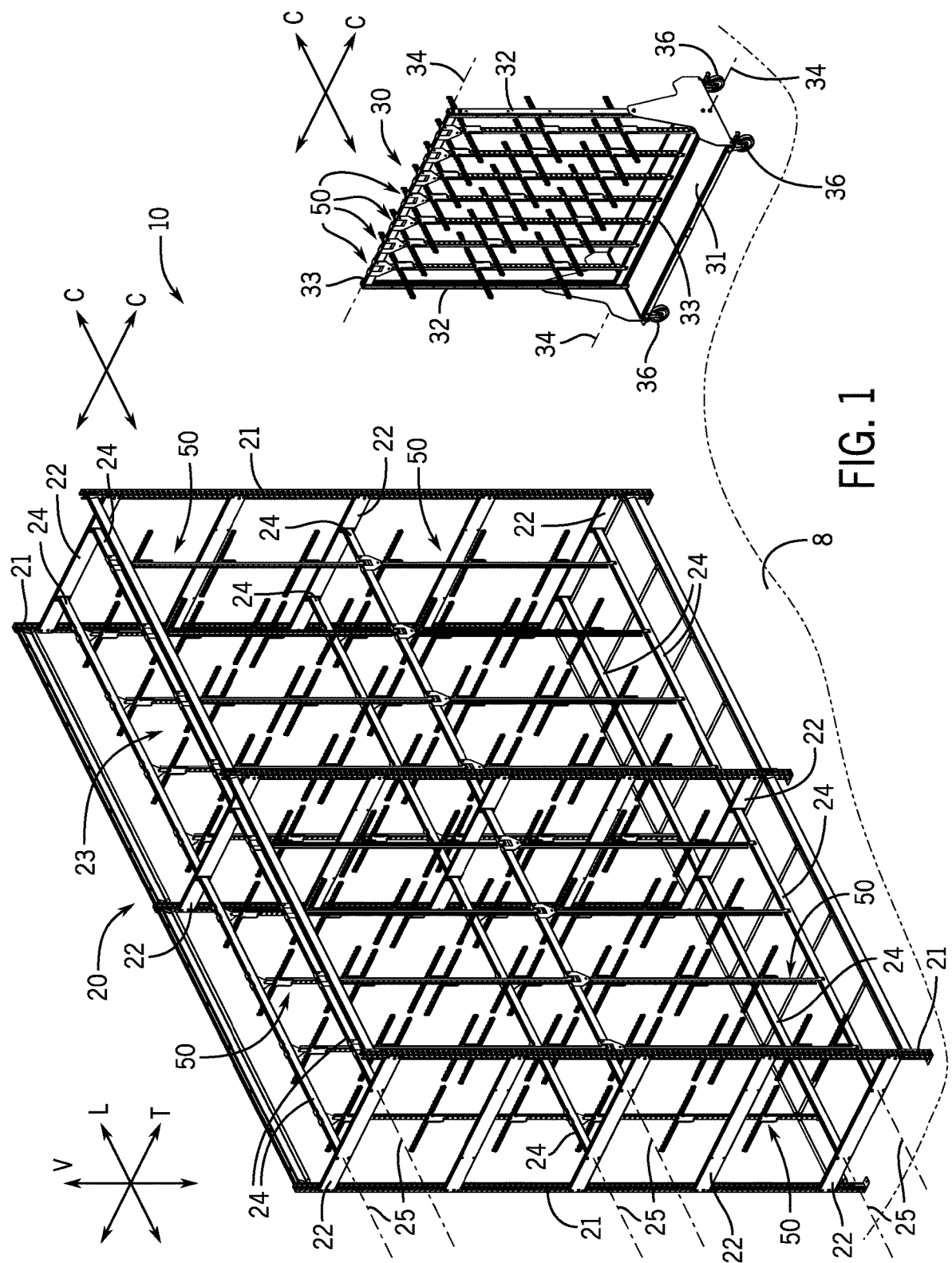
FIG. 1 is perspective view of an example plant processing system of the present disclosure.

FIG. 1 depicts an example plant processing system 10 according to the present disclosure. The plant processing system 10 is used when cultivating plants, and the system 10 facilitates handling, movement, and organization of the plants (not depicted). The term "plants" is generally used herein below to refer to plant material in various forms including cut stalks of plants, branches, limbs, or plants planted in pots. The system 10 includes one or more support structures, such as a rack 20, which could be either a stationary or mobile, a mobile cart 30, and one or more hangers 50 that can be coupled to and movable between the rack 20 and/or the mobile cart 30. Although a single rack 20 is shown, the system could also include a plurality of racks 20 that are either mobile or stationary and the mobile cart 30 could be eliminated or simply not used with this alternate system. As will be described in greater detail herein below, the hangers 50 support one or more plants therefrom and the hangers 50 can be easily moved by a user from a hanging position on one of the racks 20 to a hanging position on the mobile cart 30 or another of the racks 20, and vice versa.

The rack 20 shown in FIG. 1 includes plurality of vertical support columns 21 and plurality of cross beams 22 that are coupled together to generally form a rectangular frame. The rack 20 is designed to mount to a horizontal support surface 8 (e.g., concrete slab) or to be mounted on a mobile carriage such that the spacing between adjacent racks 20 can be adjusted. Such mobile carriages are available from Spacesaver Corporation and can be modified to accommodate the racks 20 to allow the racks 20 to be moved relative to each other. In the example depicted, the vertical support columns 21 extend vertically away from the support surface 8 (see arrow V) and the cross beams 22 either longitudinally extend (see arrow L) or laterally extend (see arrow T). The rack 20 defines an open interior space 23. The open interior space 23 includes a series of rack rails 24 that longitudinally extend between the opposite ends of the frame of the rack 20. The ends of each of the rack rails 24 are coupled to the cross beams 22 such that the cross beams 22 and vertical support columns 21 support the rack rails 24. The size and shape of the rack rails 24 can vary, and in one example, the rack rails 24 have a rectangular cross section with rounded edges (see FIG. 6).

As shown in FIG. 1, the rack rails 24 extend parallel to each other. In the embodiment shown, there are a pair of upper rack rails 24, a pair of middle rack rails 24 and a pair of lower rack rails 24 that are vertically spaced from each other. In addition, the rack rails 24 at each vertical level are laterally spaced from each other. Each rack rail 24 extends parallel to a center rack axis 25. In the example depicted in FIG. 1, the rack rails 24 are arranged in pairs at vertically spaced intervals to facilitate storage of plants at several spaced levels. As illustrated, a plurality of hangers 50 can be supported along the length of each of the rack rails 24. In FIG. 1, eight hangers 50 are depicted as hanging from each of the rack rails 24. Since there are two rack rails 24 at both the upper and intermediate levels, a total of thirty two hangers 50 are shown supported on the rack 20.

The mobile cart 30 shown in FIG. 1 includes a base 31 with wheels 36 and vertical support posts 32 extending from the base 31. The support posts 32 vertically support a pair of support rails. The support rails are shown in FIG. 1 as an upper cart rail 33 and a lower cart rail 33 relative to the base 31. In an embodiment in which the mobile cart 30 is not used, another rack 20 could be used that would include the support rails which would be similar to the rack rails 24.

The hangers 50 are designed such that the hangers can be supported between the vertically spaced cart rails 33. In the embodiment of FIG. 1, seven hangers 50 are depicted hanging from the upper cart rail 33. The size and/or the shape of the cart rail 33 can vary, and preferably the size and the shape of the cart rail 33 corresponds to the size and shape of the rack rails 24 such that hangers 50 can hang on both the rack 20 and the mobile cart 30. In one example, the cart rails 33 have a generally rectangular cross section with rounded edges. The cart rails 33 extend parallel to each other and are vertically spaced apart from each other by the same distance as the vertical spacing between the rack rails 24. Each cart rail 33 extends along a center cart axis 34. Again, in an embodiment in which the mobile cart 30 is not used, the hangers 50 could be moved between racks 20.

In operation, a user hangs hangers 50 with or without plants onto the upper cart rail 33 and pushes the mobile cart 30 along the support surface 8. Thus, the user can easily transport the hangers 50 and plants to different locations by using the mobile cart 30. The user can also push the mobile cart 30 to a location very close to the rack 20 and move the hangers 50 supported on the cart rail 33 to one of the rack rails 24. Thus, quantities of hangers and plants on the hangers 50 can be moved from the mobile cart 30 and stored in the interior space 23 of the rack 20. If the rack 20 is located in a drying location, the hangers 50 and plants can later be transferred from one of the rack rails 24 back to the cart rail 33 such that the user can move the hangers 50 and the plants away from the rack 20.

Figure 2:
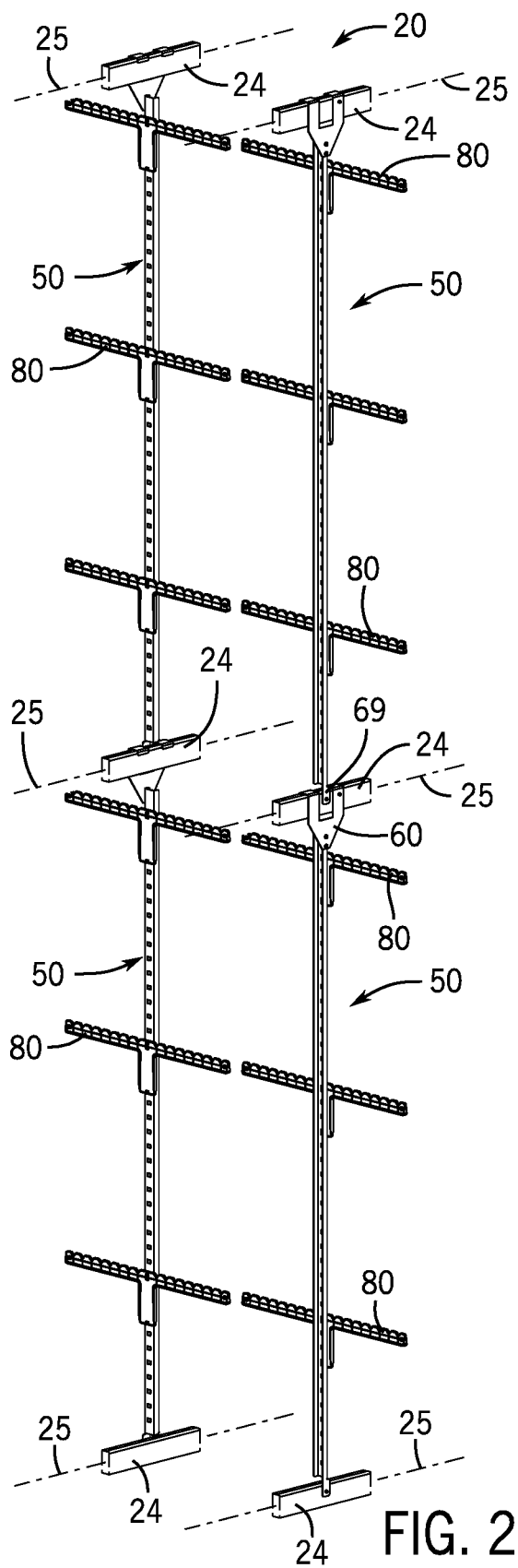
FIG. 2 is a partial enlarged view of an example stationary rack of the system of FIG. 1 with four example hangers depicted.

Referring now to FIGS. 2-6, the hangers 50 are depicted in greater detail. Specifically, FIG. 2 depicts four hangers 50 coupled to the vertically spaced rack rails 24 of the rack 20. Each hanger 50 has a first hanger end 51 that engages one of the rack rails 24 and an opposite second hanger end 52 that engages another rack rail 24 that is vertically below the rack rail 24 to which the first hanger end 51 is engaged. Thus, both hanger ends 51, 52 engage one of the rack rails 24 and accordingly, movement of the hangers 50 relative to the rack rails 24 when the hanger is hung on the rack 20 is reduced or minimized. The engagement of both hanger ends 51, 52 with one of the rack rails 24 reduces movement of the hanger 50 when the rack 20 is mounted to a mobile carriage. The mobile carriage allows the spacing between racks 20 to be modified and allows aisles to be created between adjacent rows of the racks 20.

Figure 3:
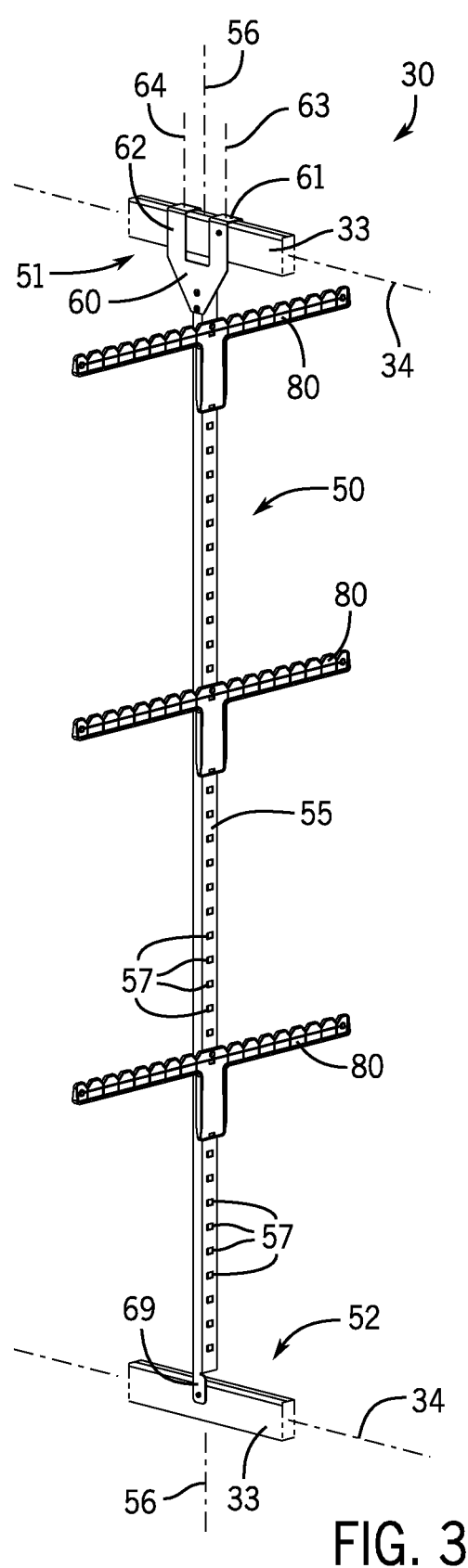
FIG. 3 is a partial enlarged view of an example mobile cart of the system of FIG. 1 with a single example hanger depicted.

FIG. 3 depicts the hangers 50 as supported on the cart rails 33. Specifically, FIG. 3 depicts one hanger 50 coupled to the upper and lower cart rails 33 of the mobile cart 30. The first hanger end 51 engages the upper cart rail 33 and the second hanger end 52 engages the lower cart rail 33 that is vertically below the cart rail 33 to which the first hanger end 51 is engaged. Thus, both hanger ends 51, 52 engage the cart rails 33 and accordingly, movement of the hangers 50 relative to the cart rails 33 when the hanger 50 is hung on the mobile cart 30 is reduced or minimized.

As shown in FIGS. 2 and 3, the hanger 50 includes a spine 55 that extends between the first end 51 and the second end 52. The spine 55 extends along a spine axis 56, and a plurality of holes 57 are defined in the spine 55. The holes 57 are spaced apart from each other and provide mounting locations for the crossbars 80 as will be described below.

Figure 4:
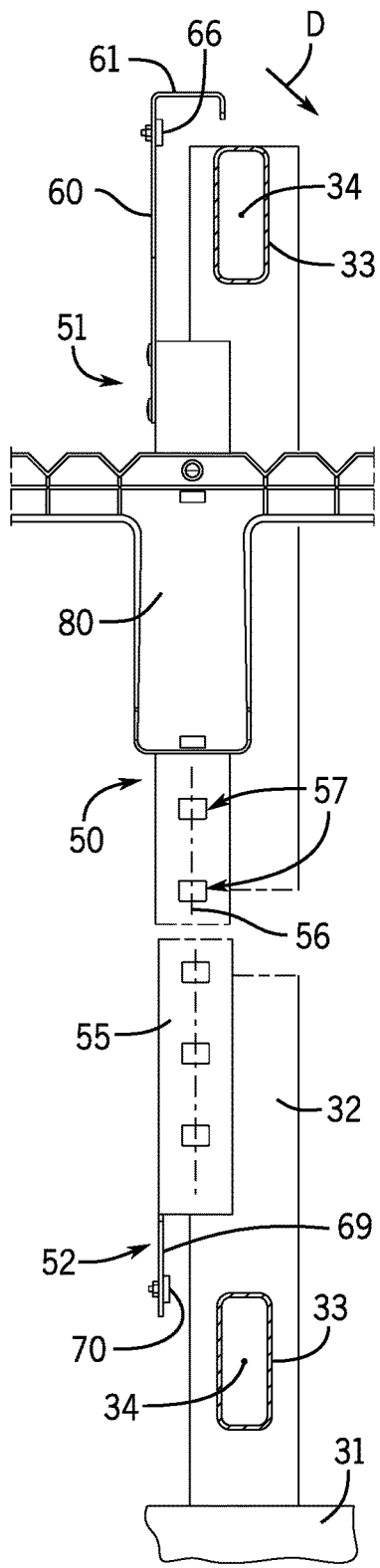
FIG. 4 is a cross sectional view of an example hanger adjacent to vertically spaced cart rails.

As best seen in FIG. 10, the hanger 50 includes a hook 60 that is securely attached to the first end 51 of the spine 55. The hook 60 is designed to engage both the rack rails 24 and the cart rails 33. The size and shape of the hook 60 can vary depending on the configuration of the rack rails 24 and the cart rails 33. In one example, the hook 60 includes a first leg 61 and a second leg 62. The second leg 62 is spaced apart from the first leg 61 to space the points of connection between the hook 60 and one of the rack rails 24 or the cart rails 33. As shown in FIG. 4, each leg 61, 62 is formed having a vertical portion, a horizontal portion and a depending finger portion such that the legs 61, 62 extend along three sides of the rack rails 24 or cart rails 33 (see FIGS. 6-7). Referring back to FIGS. 3 and 10, the first leg 61 extends along a first leg axis 63 and the second leg 62 extends along a second leg axis 64. The leg axes 63, 64 extend parallel to each other and are parallel to the spine axis 56. The leg axes 63, 64 are offset and spaced apart from the spine axis 56.

Figure 5:
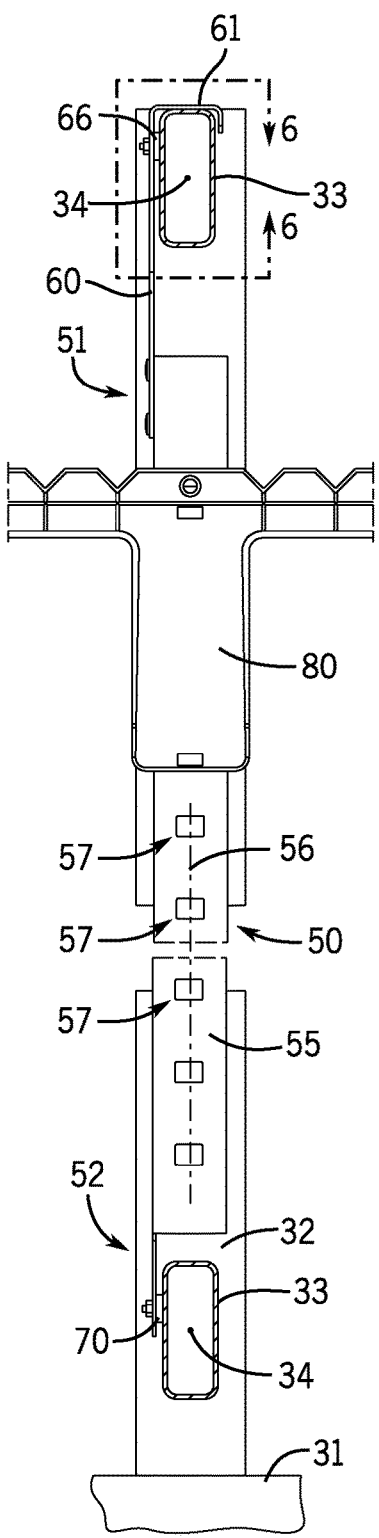
FIG. 5 is a cross sectional view similar to FIG. 4 with the hanger coupled to the vertically spaced cart rails.

As shown in FIGS. 4 and 5, a first hook magnet 66 is included on each of the first leg 61 and the second leg 62. In an alternate embodiment, only one of the first and second legs 61 and 62 could include a first hook magnet 66. The first hook magnets 66 can be connected to the first or second leg by a variety of attachment means, such as a screw connector and a nut or a rivet. The first hook magnets 66 are designed and positioned to magnetically couple the hook 60 and the legs 61, 62 to either the rack rail 24 or the cart rail 33. FIG. 5 illustrates the interaction between the first hook magnet 66 and the rack rail 33.

As shown in FIGS. 4 and 5, the hanger 50 includes a tab 69 that extends from the spine 55. The tab 69 is positioned such that the tab 69 can contact a lower cart rail 33. The tab 69 is formed at the second hanger end 52 and is designed to couple the spine 55 to either the rack rail 24 or the cart rail 33. A tab magnet 70 is attached to the tab 69 and positioned to magnetically attach the tab 69 to the cart rail 33. Note that in certain examples, the tab 69 is designed to be positioned between the legs 61, 62 of the hook 60 when multiple levels of hangers are supported on a stationary rack, such as in FIGS. 1 and 2.

Accordingly, the magnets 66 and 70 couple the hanger 50 to the rack rails 24 and the cart rails 33 and reduce or minimize movement of the hanger 50 relative to the rack rails 24 and the cart rails 33. Note that the magnets 66 and 70 can reduce movement of the hanger 50 relative to the rack rails 24 and the cart rails 33 in any direction (see example movement directions depicted by arrows C on FIG. 1) along the rack rails 24 and the cart rails 33 as we well as inadvertent swaying or rotation of the hangers 50 relative to the rack rails 24 and the cart rails 33.

Figure 6:
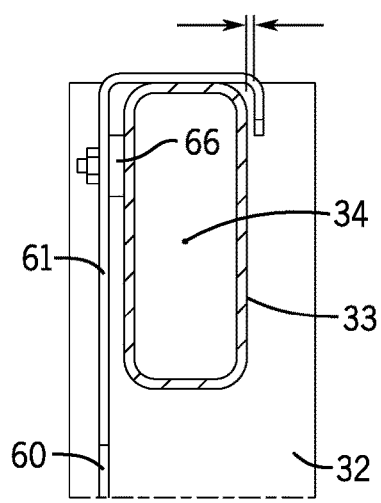
FIG. 6 is an enlarged view taken along line 6-6 of FIG. 5.

FIGS. 4-6 depict an example sequence for hanging the hanger 50 onto the cart rails 33. Note that while the below description of the example sequence is directed to the cart rails 33, the sequence for hanging the hanger 50 on the rack rails 24 will be similar.

To hang the hanger 50 on the cart rails 33, the user positions the hook 60 and the tab 69 adjacent to the upper and lower cart rails 33 (see FIG. 4) and moves the hanger 50 in a first direction (see arrow D) such that the hook 60 and the legs 61, 62 extend over the upper cart rail 33. This movement causes the tab 69 to move alongside the lower cart rail 33 (see FIG. 5). The hook magnets 66 magnetically couple the hook to the upper cart rail 33 (see FIG. 6) such that the hook 60 securely engages the upper cart rail 33. At the same time, the tab magnet 70 engages the lower cart rail 33. Note that FIGS. 4-6 depict the magnets 66,70 on the sides of the hook 60 and the tab 69 that face the cart rails 33. The configuration of the hook 60 and the cart rails 33 allow the hanger 50 to have unlimited adjustability along the length of the cart rails or the rack rails.

FIGS. 7-11 depict the crossbar 80 used to physically engage the plants in greater detail. As discussed previously, each of the hangers 50 can support one or more crossbars 80 from which plants are hung. As shown in FIG. 7, the crossbar 80 has a first end 81, an opposite second end 82, a first side 83, and an opposite second side 84. The crossbar 80 is generally T-shaped with a body 86 and two opposing crossbar legs 87. The crossbar legs 87 have a plurality of recesses or notches 88 defined therein in which the plants may sit when the plants are hung on the crossbar 80. In the example depicted in FIG. 7, the crossbar legs 87 and the recesses 88 are arranged such that the crossbar 80 has a scalloped upper edge.

The crossbar 80 also includes one or more attachment fingers 85. The attachment fingers 85 are designed and sized such that the fingers 85 can be received into the holes 57 of the spine 55 (see FIGS. 2 and 3) to thereby couple the crossbar 80 to the spine 55 at a desired location along the length of the spine 55. The interaction between the fingers 85 on the crossbar 80 and the holes 57 on the spine 55 allow the crossbars 80 to be removed and reattached to the spine 55 as desired by the user. The fingers 85 have vertically downturned lips 89 that prevent inadvertent movement of the crossbar 80 in a direction away from the spine 55 once the crossbar 80 is coupled to the spine 55. In the embodiment shown in FIG. 7, a protrusion 91 is formed between the pair of attachment fingers 85. The protrusion 91 is designed to seat into one of the holes 57 of the spine 55 to help hold the crossbar in the mounted position. The protrusion 91 is positioned between the attachment fingers 85 such that the protrusion is aligned with one of the holes 57 after the crossbar 80 is lowered into the mounting position.

FIGS. 8-11 depict an example sequence for coupling the crossbar 80 to the spine 55. To connect the crossbar 80 to the spine 55, the user first aligns the fingers 85 with corresponding holes 57 in the spine 55 (see FIGS. 8-9). The distance between the fingers 85 and the distance between the holes 57 in the spine 55 are the same to facilitate mounting of the crossbar 80 to the spine 55.

The user then moves the crossbar 80 in a direction toward the spine 55 (see arrow E on FIG. 9) such that the fingers 85 move through the holes 57. The user then moves the crossbar 80 in a vertically downward direction (see arrow F) until the fingers 85 contact the spine 55. Note that the user could also release the crossbar 80 such that the crossbar 80 automatically moves in the vertically downward direction under force of gravity. As noted above, the lips 89 on each of the fingers 85 prevent movement of the crossbar 80 away from the spine 55 (see arrow H), and thus, the crossbar 80 is coupled to the spine 55. During this movement, the protrusion 91 enters into one of the holes 57 in the spine 55 to further support the crossbar 80 along the spine 55. The user can then hang plants on the crossbar legs 87. Note that the fingers 85 are spaced apart from each other and received into different holes 57 such that the fingers 85 prevent rotation of the crossbar 80 relative to the spine 55 as the plants are hung on the crossbar 80. Also note that the crossbar 80 can be located at any position along the spine 55.

To remove the crossbar 80 from the spine 55, the user applies a force in a vertically upward direction (see arrow G; e.g., a lifting force) to the crossbar 80 such that the fingers 85 move through the holes 57 as the crossbar 80 is pulled in a direction away from the spine 55 (see arrow H). Once the crossbar 80 has been removed from the spine 55, the crossbar 80 can be reattached to the spine 55 at a desired location along the length of the spine 55.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A plant processing system comprising:
   a horizonal support rail;
   a rack with at least one horizontal rack rail; and
   a hanger configured to support one or more plants therefrom, wherein the hanger includes a spine that extends along a spine axis and is hangable from the support rail or the rack rail and is movable between the support rail and the rack rail, wherein the spine axis is vertical when the hanger is hung from either the support rail or the rack rail,
   wherein the hanger has a hook with at least one hook magnet that magnetically couples the hanger to the support rail or the rack rail.

2. The plant processing system according to claim 1, wherein the hook includes a first leg and a second leg that each engage the support rail or the rack rail.

3. The plant processing system according to claim 2, wherein the first leg is spaced apart from the second leg.

4. The plant processing system according to claim 2, wherein the first leg extends along a first leg axis that is parallel and offset from the spine axis and the second leg extends along a second leg axis that is parallel and offset from the spine axis.

5. The plant processing system according to claim 1, wherein the hook has a first leg and a second leg that each engage the support rail or the rack rail, wherein at least one of the first arm and the second arm includes the hook magnet.

6. A plant processing system comprising:
a mobile cart having wheels such that the cart is movable along a support surface;
a first cart rail and a second cart rail mounted to the mobile cart, wherein the first cart rail and the second cart rail are horizontal and the second cart rail is spaced apart from the first cart rail;
a rack with a first rack rail and a second rack rail that is spaced apart from the first rack rail, wherein the first cart rail and the second cart rail are horizonal; and
a hanger configured to support one or more plants therefrom, the hanger having a spine that extends along a spine axis, a first hanger end and an opposite second hanger end, wherein the hanger is hangable from the first cart rail or the first rack rail and is movable between the first cart rail and the first rack rail, wherein the spine axis is vertical when the hanger is hung from either the first cart rail or the first rack rail,
wherein the first hanger end has a magnet that magnetically couples the hanger to the first rack rail or the first cart rail to thereby reduce movement of the hanger relative to the first cart rail or the first rack rail.

7. The plant processing system according to claim 6, wherein the second hanger end has a magnet that magnetically couples the hanger to the second rack rail or the second cart rail to thereby reduce movement of the hanger relative to the second cart rail or the second rack rail.

8. A plant processing system comprising:
a support rail;
a rack with at least one rack rail;
a hanger configured to support one or more plants therefrom, wherein the hanger is hangable from the support rail or the rack rail and is movable between the support rail and the rack rail, the hanger further comprising:
a hook that engages the support rail or the rack rail, the hook having at least one hook magnet that magnetically couples the hanger to the support rail or the rack rail;
a spine with a plurality of holes; and
a crossbar removably coupled to the spine and configured to support the plants therefrom, wherein when the crossbar is coupled to the spine, the crossbar is received into one or more holes in the plurality of holes, and wherein the crossbar is movable into different positions along the spine.

* * * * *